United States Patent
Gai et al.

(10) Patent No.: US 12,159,218 B1
(45) Date of Patent: Dec. 3, 2024

(54) DROPOUT LAYER IN A NEURAL NETWORK PROCESSOR

(71) Applicant: Amazon Technologies, Inc., Seattle, WA (US)

(72) Inventors: Jiading Gai, Seattle, WA (US); Hongbin Zheng, San Jose, CA (US); Animesh Jain, Fremont, CA (US); Randy Renfu Huang, Morgan Hill, CA (US); Vignesh Vivekraja, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 713 days.

(21) Appl. No.: 16/940,199

(22) Filed: Jul. 27, 2020

(51) Int. Cl.
  *G06N 3/063* (2023.01)
  *G06N 3/04* (2023.01)

(52) U.S. Cl.
  CPC .............. *G06N 3/063* (2013.01); *G06N 3/04* (2013.01)

(58) Field of Classification Search
  CPC ................................. G06N 3/063; G06N 3/04
  See application file for complete search history.

(56) References Cited

U.S. PATENT DOCUMENTS

| | | | | |
|---|---|---|---|---|
| 11,410,040 | B2* | 8/2022 | Yoo | G06N 3/04 |
| 2016/0307098 | A1* | 10/2016 | Goel | G06N 3/045 |
| 2018/0307980 | A1* | 10/2018 | Barik | G06F 9/3877 |
| 2020/0201604 | A1* | 6/2020 | Felix | G06N 3/08 |
| 2021/0089611 | A1* | 3/2021 | Jiao | G06N 3/084 |
| 2021/0256362 | A1* | 8/2021 | Lie | G06N 3/047 |

OTHER PUBLICATIONS

Xu, W. (n.d.). Tutorial: Dropout as regularization and Bayesian approximation. Dropout Tutorial in PyTorch. Retrieved Mar. 25, 2023, from https://xuwd11.github.io/Dropout_Tutorial_in_PyTorch/ (Year: 2018).*
Ranjan, C. (2022, Feb. 17). Simplified math behind dropout in Deep Learning. Medium. Retrieved Mar. 25, 2023, from https://towardsdatascience.com/simplified-math-behind-dropout-in-deep-learning-6d50f3f47275 (Year: 2019).*
Sussman, Myles, William Crutchfield, and Matthew Papakipos. "Pseudorandom number generation on the GPU." Graphics Hardware. 2006. (Year: 2006).*
Golub, Maximilian. DropBack: continuous pruning during deep neural network training. Diss. University of British Columbia, 2018. (Year: 2018).*

* cited by examiner

*Primary Examiner* — Miranda M Huang
*Assistant Examiner* — Sidney Vincent Bostwick
(74) *Attorney, Agent, or Firm* — Weaver Austin Villeneuve & Sampson LLP

(57) ABSTRACT

A single instruction multiple data (SIMD) processor is used to implement a dropout layer between a first layer and a second layer of a neural network. The SIMD processor can implement the dropout layer by setting one or more elements in an output tensor of the first layer to zero before providing it as an input tensor to the second layer. Setting of the one or more elements to zero is based on a dropout rate, and pseudo-random numbers generated by a random number generator in the SIMD processor.

17 Claims, 12 Drawing Sheets

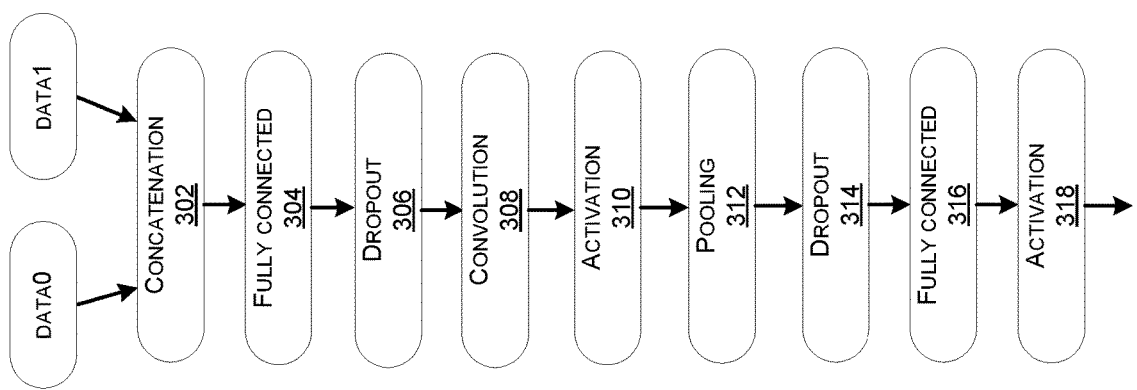

DROPOUT LAYER IN A NEURAL NETWORK PROCESSOR

BACKGROUND

Artificial neural networks are computing systems with an architecture based on biological neural networks. Artificial neural networks can be trained, using training data, to learn how to perform a certain computing task, such as speech synthesis or object detection.

Certain neural network models can be trained almost perfectly with the training data but may not generalize well because of overfitting. Overfitting can be a common problem, especially in deep learning models. Regularization can be used to control overfitting and improve model generalization performance. Dropout is an operation that can be performed to introduce regularization during neural network training.

BRIEF DESCRIPTION OF THE DRAWINGS

Various embodiments in accordance with the present disclosure will be described with reference to the drawings, in which:

FIG. 3 illustrates a data flow graph that includes a dropout operator to enable the implementation of a dropout layer between two layers of a neural network, according to certain embodiments;

DETAILED DESCRIPTION

Figure 1:
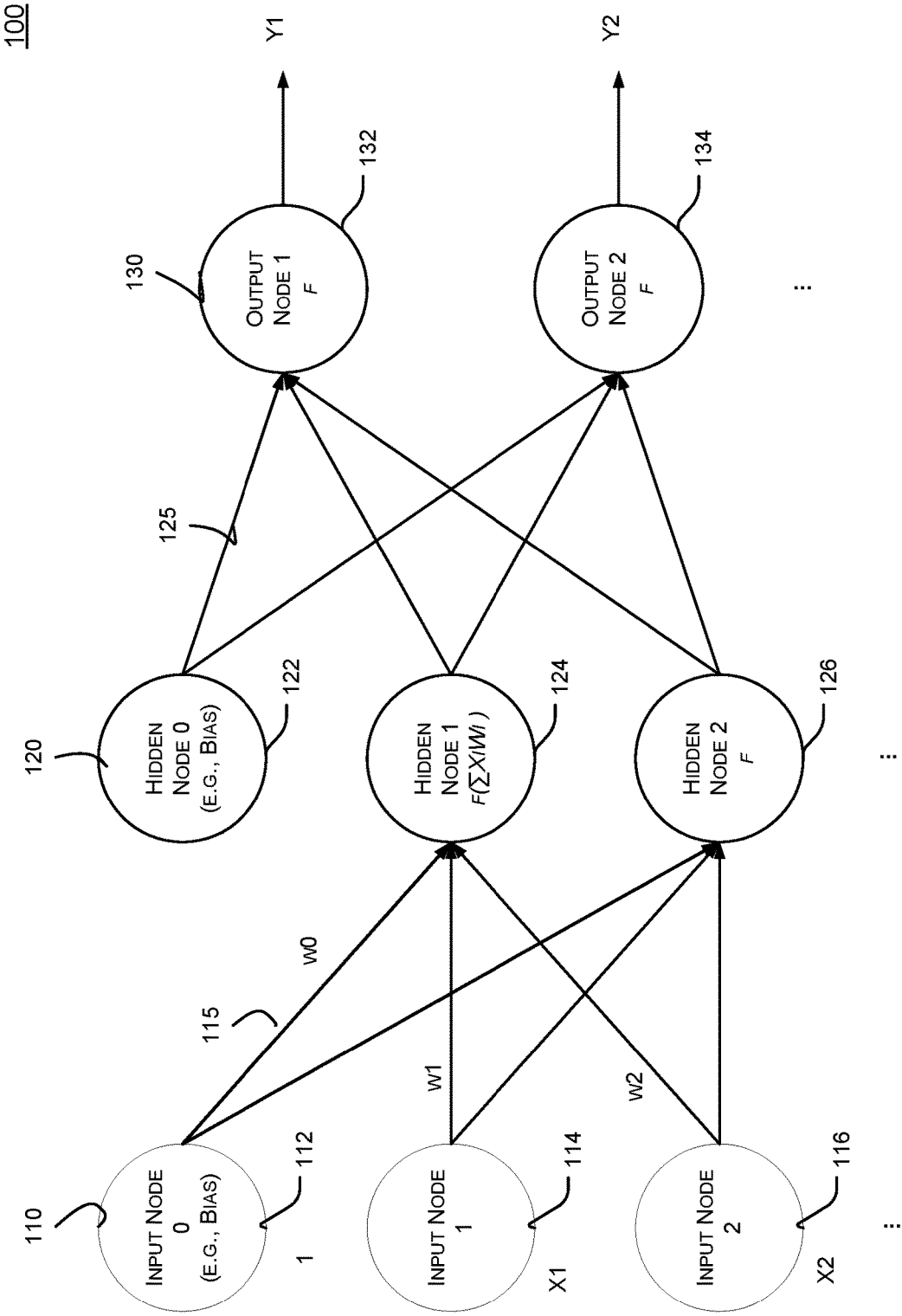
FIG. 1 illustrates an example of a multi-layer neural network.

Techniques disclosed herein relate generally to artificial neural networks, and more specifically, implementing a dropout layer in a neural network using a single instruction multiple data (SIMD) neural network processor. An artificial neural network may generally include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer) may receive a sequential stream of input data elements, multiply each input data element with a weight, compute a weighted sum of the input data elements, and forward the weighted sum to the next layer. An artificial neural network, such as a convolutional neural network (CNN), may include thousands or more of processing nodes and millions or more of weights and input data elements.

Artificial neural networks can be trained using training data to learn how to perform a certain task, such as identifying or classifying physical objects, activities, characters, from images or videos, speech synthesis, etc. In some cases, a neural network model may be fitted to training data so closely that it may not be able to generalize and make predictions for new data. Generalization error can increase due to overfitting. This has the effect of the model learning the statistical noise in the training data, which can result in poor performance when the model is evaluated on a new dataset. However, it is desirable to have neural network models that can generalize well from the training data to any data from the problem domain. Dropout can be used to reduce overfitting and improve generalization error in deep neural networks. Dropout may include dropping out or ignoring random nodes (including their connections) during training which can prevent the model from overly co-adapting.

Dropout can be implemented by randomly setting a dropout rate of input elements to zero at each update during training time, which can help prevent overfitting. Remaining elements that are kept can be scaled by $(1/(1\text{-dropout rate}))$ so that their sum is unchanged at training time and inference time. In some examples, the input elements can be scaled by $(1/(1\text{-dropout rate}))$ prior to dropout. Dropout can be generally implemented in training mode by setting a flag. For example, in "MXNet" and "TensorFlow" frameworks, "always" and "training" flags can be used respectively to control the dropout behavior. However, these flags are unset in inference mode, and therefore the dropout functions as a pass through layer.

Supporting dropout in the inference mode can be desirable for certain applications, such as, text to speech synthesis, natural language processing. Some systems may use a CPU to implement the dropout behavior (for example, using a conditional statement) but it can cause performance degradation since the CPU may have to put other tasks on hold while it is processing the dropout operator.

Certain embodiments can enable implementation of a dropout layer using a single instruction multiple data (SIMD) neural network processor, which can provide training mode behavior of dropout even in inference mode. According to certain embodiments, a compiler can compile a neural network model to generate instructions that can be executed by a neural network processor comprising a processing engine array and an SIMD processor. The instructions may include instructions for performing convolution operations using the processing engine, and instructions to implement a dropout layer between any two layers of the neural network model using the SIMD processor. The neural network model may implement the dropout layer based on a dropout operator or flag. For example, if the dropout operator is set, a dropout layer between a first layer and a second layer of the neural network model may be implemented based on a dropout rate, and if the dropout operator is not set, the dropout layer may not be implemented. For example, the first layer may output a first tensor of N elements that may provide an input to the second layer if the dropout operator is not set.

According to certain embodiments, the SIMD processor may be configured to implement a dropout layer between the first layer and the second layer by randomly dropping out one or more elements in the first tensor to generate a second tensor of N elements that can be used as the input to the second layer. Dropping out one or more elements may equate to setting those elements to 0. The number of elements set to 0 in the second tensor may be based on the dropout rate. In certain embodiments, the SIMD processor may execute the instructions generated by the compiler to perform certain operations to implement the dropout layer. The SIMD processor may comprise N processing units that can execute the same instruction on N data elements simultaneously. The N-dimensional data path in the SIMD processor can be used to implement random (or pseudo-random) number generators. The random number generators may be capable of generating up to N random numbers in parallel with uniform distribution. The range of the random numbers generated can be constrained up to range of values supported by the random number generators. The SIMD processor may use the random number generator to generate N random numbers that can be used to dropout certain elements in the first tensor based on the dropout rate.

In certain implementations, the SIMD processor may generate a binary tensor mask of N binary elements by converting N random numbers to 1's and 0's based on the dropout rate. For example, the 1's in the binary tensor mask may correspond to the random numbers that are greater than or equal to the dropout rate, and the 0's may correspond to the random numbers that are smaller than the dropout rate. The SIMD processor may perform an element-wise multiplication between the binary tensor mask and the first tensor to generate a second tensor of N elements. The second tensor can be used as an input to the second layer. Thus, for a dropout rate of M, the SIMD processor can set M percentage of N elements in the first tensor to 0 to produce a second tensor. In certain implementations, each of the N elements in the first tensor can be scaled by 1/(1-dropout rate) before generating the second tensor to compensate for the dropped out elements. In other implementations, instead of scaling the elements in the first tensor, non-zero elements in the second tensor can be scaled by 1/(1-dropout rate).

Thus, the embodiments can be used to accelerate certain neural networks for applications like natural language processing, text-to-speech synthesis, etc., by making use of parallel processing units in the SIMD processor. Additionally, use of the SIMD processor to implement the dropout layer instead of the CPU can free up the CPU to perform other important tasks.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a multi-layer neural network 100. Multi-layer neural network 100 may include an input layer 110, a hidden (or intermediate) layer 120, and an output layer 130. The input layer 110 may include a plurality of input nodes (e.g., nodes 112, 114, and 116) that may provide information (e.g., input data) from the outside world to the network. The input nodes may pass on the information to the next layer, and no computation may be performed by the input nodes. The hidden layer 120 may include a plurality of nodes, such as nodes 122, 124, and 126. The nodes in the hidden layer 120 may have no direct connection with the outside world (hence the name "hidden"). They may perform computations and transfer information from the input nodes to the next layers (e.g., another hidden layer or output layer 130). While a feedforward neural network may have a single input layer and a single output layer, it may have zero or multiple hidden layers. The output layer 130 may include a plurality of output nodes that are responsible for computing and transferring information from the network to the outside world, such as recognizing certain objects or activities, or determining a condition or an action.

As shown in FIG. 1, in a feedforward neural network, a node (except the bias node if any) may have connections to all nodes (except the bias node if any) in the immediately preceding layer and the immediately subsequent layer. Thus, the layers may be referred to as fully-connected layers. All connections between nodes may have weights associated with them, even though only some of these weights are shown in FIG. 1. For a complex network, there may be hundreds or thousands of nodes and thousands or millions of connections between the nodes.

As described above, a feedforward neural network may include zero (referred to as a single layer perceptron) or one or more hidden layers (referred to as a multi-layer perceptron (MLP)). Even though FIG. 1 only shows a single hidden layer in the MLP, an MLP may include one or more hidden layers (in addition to one input layer and one output layer). A feedforward neural network with many hidden layers may be referred to as a deep neural network. While a single layer perceptron may only learn linear functions, an MLP can learn non-linear functions.

In the example shown in FIG. 1, the node 112 may be a bias node having a value of 1 or may be a regular input node. The nodes 114 and 116 may take external inputs X1 and X2, which may be numerical values depending upon the input dataset. As discussed above, no computation is performed on the input layer 110, and thus the outputs from the nodes 112, 114, and 116 on the input layer 110 are 1, X1, and X2, respectively, which are fed into the hidden layer 120.

In the example shown in FIG. 1, the node 122 may be a bias node having a value of 1 or may be a regular network node. The outputs of the nodes 124 and 126 in the hidden layer 120 may depend on the outputs from the input layer 110 (e.g., 1, X1, X2) and weights associated with connections 115. For example, the node 124 may take numerical inputs X1 and X2 and may have weights w1 and w2 associated with those inputs. Additionally, the node 124 may have another input (referred to as a bias), such as 1, with a weight w0 associated with it. The main function of the bias is to provide every node with a trainable constant value (in addition to the normal inputs that the node receives). The bias value may allow one to shift the activation function to the left or right. It is noted that even though only three inputs to the node 124 are shown in FIG. 1, in various implementations, a node may include tens, hundreds, thousands, or more inputs and associated weights.

An output Y from the node 124 may be computed by:

$$Y = f(w1 \times X1 + w2 \times X2 + w0 \times \text{bias}),\qquad(1)$$

where function f may be a non-linear function that is often referred to as an activation function. When a node has K inputs, the output from the node may be computed by:

$$Y = f\left(\sum_{i=0}^{K} w_i X_i\right).\qquad(2)$$

Thus, the computation on each neural network layer may be described as a multiplication of an input matrix and a weight matrix and an activation function applied on the products of the matrix multiplication. The outputs from the nodes on an intermediate layer may then be fed to nodes on the next layer, such as the output layer 130.

The activation function may introduce non-linearity into the output of a neural network node. One example of the activation function is the sigmoid function σ(x), which takes a real-valued input and transforms it into a value between 0 and 1. Another example of the activation function is the tanh function, which takes a real-valued input and transforms it into a value within the range of [−1, 1]. A third example of the activation function is the rectified linear unit (ReLU) function, which takes a real-valued input and thresholds it above zero (e.g., replacing negative values with zero). Another example activation function is the leaky ReLU function.

The output layer 130 in the example shown in FIG. 1 may include nodes 132 and 134, which may take inputs from the hidden layer 120 and perform similar computations as the hidden nodes using weights associated with connections 125. The calculation results (Y1 and Y2) are the outputs of the MLP. In some implementations, in an MLP for classification, a Softmax function may be used as the activation function in the output layer. The Softmax function may take a vector of real-valued scores and map it to a vector of values between zero and one that sum to one, for example, for object classification.

As described above, the connections between nodes of adjacent layers in an artificial neural network have weights associated with them, where the weights may determine what the output vector is for a given input vector. A learning or training process may assign appropriate weights for these connections. In some implementations, the initial values of the weights may be randomly assigned. For every input in a training dataset, the output of the artificial neural network may be observed and compared with the expected output, and the error between the expected output and the observed output may be propagated back to the previous layer. The weights may be adjusted accordingly based on the error. This process is repeated until the output error is below a predetermined threshold.

In many situations, using the feedforward neural network as described above for real-world application, such as image classification, may not be practical due to, for example, the size of the input data and the number of weights to be trained and applied. One way to overcome these issues is to use CNNs that perform convolutions using smaller convolutional filters rather than the large matrix multiplications as described above. A same filter may be used for many locations across the image when performing the convolution. Learning a set of convolutional filters (e.g., 7×7 matrices) may be much easier and faster than learning a large weight matrix for a fully-connected layer.

A Convolutional neural network (ConvNet or CNN) may perform operations including, for example: (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

Figure 2:
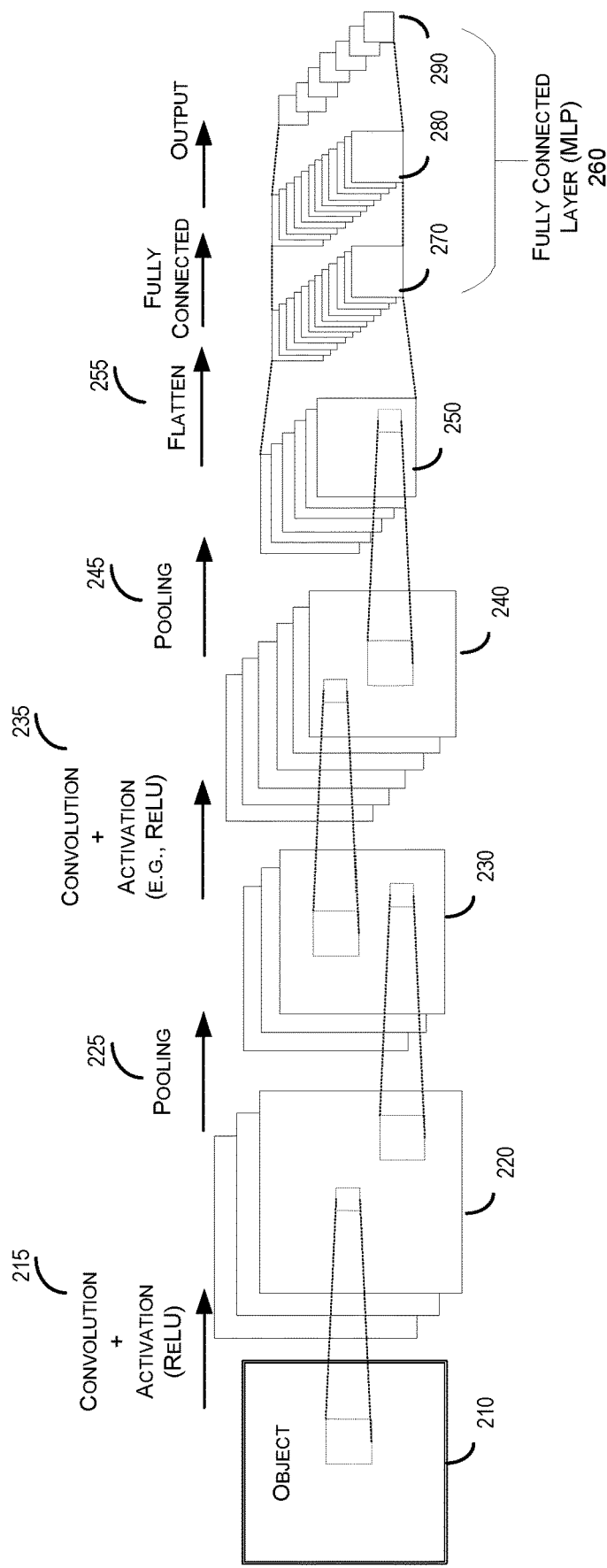
FIG. 2 illustrates an example of a convolutional neural network (CNN).

FIG. 2 illustrates an example of a CNN 200. As described above, the CNN 200 may perform four types of operations including convolution, non-linearity (or activation) function (e.g., ReLU), pooling or sub-sampling, and classification (fully-connected layer). An object 210 to be classified, such as one or more input images or other input datasets (referred to as input feature maps), may be represented by a matrix of pixel values. For example, the object 210 may include multiple channels (e.g., multiple input feature maps), each channel representing a certain component of the object 210. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using the CNN 200 is described. Other channels may be processed similarly.

As shown in FIG. 2, the object 210 (e.g., input images) may first be processed by a first convolution layer 215 using a first set of filters, where the first convolution layer 215 may perform a convolution between a matrix representing the input image and a matrix representing each filter in the first set of filters. The convolution may include multiple matrix multiplication. The first convolution layer 215 may also perform a non-linear activation function (e.g., ReLU). An output matrix 220 from the first convolution layer 215 may have smaller dimensions than the input image. The first convolution layer 215 may perform convolutions on the input image using the first set of filters to generate multiple output matrices 220, which may be referred to as output feature maps of the first convolution layer 215. The number of filters used may be referred to as the depth of the convolution layer. In the example shown in FIG. 2, the first convolution layer 215 may have a depth of three. Each output matrix 220 (e.g., an output feature map) may be passed to a pooling layer 225, where each output matrix 220 may be subsampled or down-sampled to generate a matrix 230.

Each matrix 230 may be processed by a second convolution layer 235 using a second set of filters. A non-linear activation function (e.g., ReLU) may also be performed by the second convolution layer 235 as described above. An output matrix 240 (e.g., an output feature map) from second convolution layer 235 may have smaller dimensions than the matrix 230. The second convolution layer 235 may perform convolutions on the matrix 230 using the second set of filters to generate multiple output matrices 240. In the example shown in FIG. 2, the second convolution layer 235 may have a depth of six. Each output matrix 240 may be passed to a pooling layer 245, where each output matrix 240 may be subsampled or down-sampled to generate an output matrix 250.

The output matrices 250 from the pooling layer 245 may be flattened to vectors by a flatten layer 255, and passed through a fully-connected layer 260 (e.g., an MLP). The fully-connected layer 260 may include an input layer 270 that takes the 2-D output vector from the flatten layer 255. The fully-connected layer 260 may also include a hidden layer 280 and an output layer 290. The fully-connected layer 260 may classify the object in the input image into one of several categories using feature maps or output matrix 250 and, for example, a Softmax function. The operation of the fully-connected layer may be represented by matrix multiplications. For example, if there are M nodes on the input layer 270 and N nodes on hidden layer 280, and the weights of the connections between the M nodes on the input layer 270 and the N nodes on hidden layer 280 can be represented by a matrix W that includes MxN elements, the output Y of the hidden layer 280 may be determined by Y=XxW.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyper parameters), such as the number of filters, the filter size, the architecture of the network. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in the CNN 200 shown in FIG. 2, three distinct filters are used in the first convolution layer 215 to perform convolution operations on the input image, thus producing three different output matrices (or feature maps) 220. Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 2, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tanh or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 2, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a CNN, such as CNN 200, may be similar to the training process for any feedforward neural network. First, all parameters and weights (including the weights in the filters and weights for the fully-connected layer) may be initialized with random values (or the parameters of a known neural network). Second, the CNN may take a training sample (e.g., a training image) as input, perform the forward propagation steps (including convolution, non-linear activation, and pooling operations, along with the forward propagation operations in the fully-connected layer), and determine the output probability for each possible class. Since the parameters of the CNN, such as the weights, are randomly assigned for the training example, the output probabilities may also be random.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

In some cases, training large neural network models on relatively small datasets can over-fit the training data. This has the effect of the model learning the statistical noise in the training data, which can result in poor performance when the model is evaluated on the new dataset. Dropout can be used to reduce overfitting and improve generalization error in deep neural networks. Dropout may include dropping out or ignoring random nodes (including their connections) during training which can prevent the model from overly co-adapting. Dropout can be implemented in a framework based on a flag, similar to the flags "always" in MXNet or "training" in Tensorflow. When the flag is set, dropout can be implemented by randomly setting a dropout rate of elements in the input tensor to 0 at each update during training time. The elements that are kept can be scaled by (1/1-dropout rate) so that their sum is unchanged at training time and inference time. Generally, the flags are unset in the inference mode and the dropout layer behaves as a pass through layer in a typical inference flow. However, certain applications (e.g., speech synthesis) may require "training mode" behavior of dropout even for inference.

Certain embodiments can be used to provide the "training mode" behavior of dropout in the inference mode using an SIMD processor. The SIMD processor can be a part of a neural network processor. The neural network processor can execute instructions to implement a dropout layer based on a dropout operator. The instructions can be generated from a compiler in a host system. The compiler can compile a data flow graph into instructions that can be executed by the neural network processor. The data flow graph may include nodes to represent various operations such as convolution operations, activation, dropout, memory operations, computations, among others. An example data flow graph is discussed with reference to FIG. 3.

FIG. 3 illustrates a data flow graph 300 that includes a dropout operator to enable the implementation of a dropout layer between two layers of a neural network, according to certain embodiments. The data flow graph 300 shown in FIG. 3 can be part of a larger data flow graph (not shown) that can be compiled by a compiler on a host system to generate instructions that can be executed by a neural network processor comprising an SIMD processor. The neural network processor can be on a different host system.

The example data flow graph 300 may include operators to perform different operations or implement different layers of a neural network such as the CNN 200. The operators may include a concatenation operator 302, fully-connected operator 304, dropout operator 306, convolution operator 308, activation operator 310, pooling operator 312, dropout operator 314, fully-connected operator 316, and an activation operator 318. The concatenation operator 302 may be used to concatenate data0 and data1 to generate an input data for a fully-connected layer implemented by the fully-connected operator 304. The fully-connected operators 304 and 316 may be used to implement a respective fully-connected layer similar to the fully-connected layer 260 describe with reference to FIG. 2.

The convolution operator 308 may be used to implement a convolution layer similar to the convolution layer 215. For example, the convolution layer may perform a matrix multiplication between a matrix representing the input feature map and a matrix representing a filter. The activation operators 310 and 318 may be used to perform a non-linear activation function (e.g., ReLU) on a preceding layer. For example, the activation operator 310 may be used to perform an activation function on a convolution layer implemented by the convolution operator 308 and the activation operator 318 may be used to perform an activation function on the a fully-connected layer implemented by the fully-connected operator 316. The pooling operator 312 may be used to implement a pooling layer similar to the pooling layer 245. The pooling layer may be used to subsample or downsample the output matrix of an activation layer implemented by the activation operator 310.

The dropout operator 308 may be used to implement a drop layer between a fully-connected layer implemented by the fully-connect operator 304 and a convolution layer implemented by the convolution operator 308. Similarly, the dropout operator 316 may be used to implement a drop layer between a pooling layer implemented by the pooling operator 312 and a fully-connected layer implemented by the fully-connected operator 316. For example, based on a given dropout operator being set or asserted, a dropout layer can be implemented between two layers to randomly drop out certain elements in a tensor output of a preceding layer before feeding it as an input tensor to a subsequent layer. If the dropout operator is not set or disabled, the dropout layer acts like a pass-through layer and the tensor output of the preceding layer feeds the input tensor of the subsequent layer. According to certain embodiments, each dropout operator in the dataflow graph 300 (e.g., the dropout operators 308 and 316) can include operations discussed with reference to FIGS. 4A and 4B.

Figure 4A:
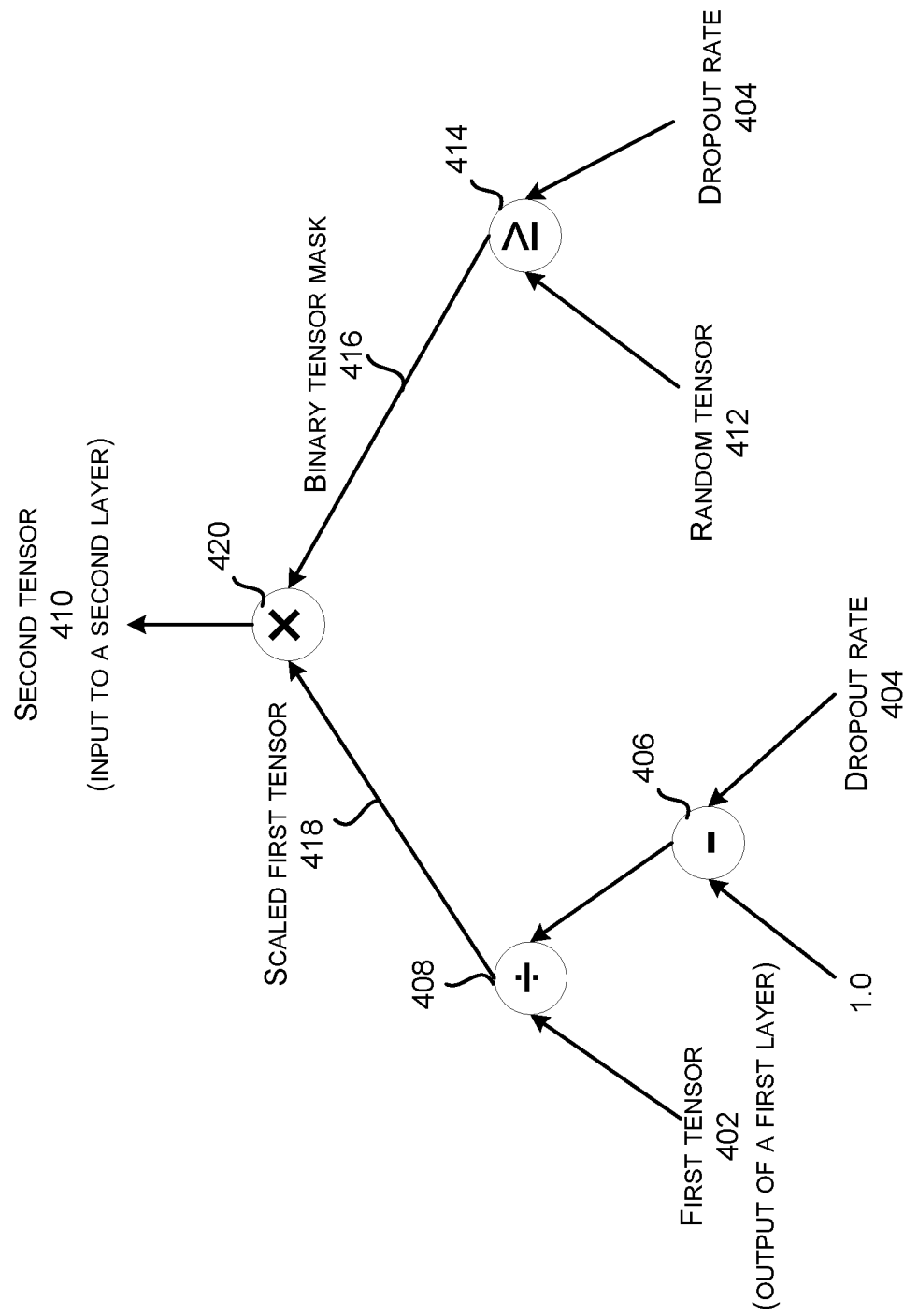
FIG. 4A illustrates a first data flow graph that includes operations to implement the dropout layer using scaled input tensor elements, in a first embodiment.

FIG. 4A illustrates a data flow graph 400A that includes operations to implement the dropout layer using scaled input tensor elements, in a first embodiment. The data flow graph 400A can be compiled by a compiler to generate instructions that can be executed by a neural network processor comprising an SIMD processor to implement a dropout layer between two layers of a neural network.

According to certain embodiments, the SIMD processor may receive a first tensor 402 as an input tensor to implement a dropout layer based on the dropout operator 308 being set. The first tensor 402 may be output of a fully-connected layer implemented by the fully-connected operator 304. The SIMD processor may be configured to generate a second tensor 410 based on a dropout rate 404 and a random tensor 412. The second tensor 410 may be used as an input to a convolution layer implemented by the convolution operator 308. Each of the first tensor 402 and the second tensor 410 can be of shape N, where N is a positive integer. The dropout rate 404 can be included in the machine code received by the compiler along with the dropout operator. The dropout rate 404 can vary based on the type of application (e.g., speech synthesis, object detection). The random tensor 412 can include N random numbers generated by the SIMD processor. For example, the SIMD processor can execute an instruction to generate N random numbers in parallel using a random (or pseudo-random) number generator. In certain implementations, each random number can have a value between 0 and 1. The random numbers may have a uniform distribution and values within a certain range. In various embodiments, a tensor can be a vector or a scaler.

A binary tensor mask 416 of shape N can be generated using a comparison operator 414 on the random tensor 412 and the dropout rate 404. The binary tensor mask 416 may comprise N binary elements having values 1 or 0. For example, the comparison operator 414 may compare each element of the random tensor 412 with the dropout rate 404 and populate the binary tensor mask 416 with a 1 for each element in the random tensor 412 that is greater than or equal to the dropout rate 404, and with a 0 for each element in the random tensor 412 that is less than the dropout rate 404.

In the first embodiment, each element in the first tensor 402 can be scaled by (1/(1-dropout rate)) using a subtraction operator 406 and a division operator 408 to generate a scaled first tensor 418 of shape N. For example, the subtraction operator 406 can be used to subtract the dropout rate 404 from 1, and the subtraction result can be used to divide each element of the first tensor 402 to generate a respective scaled element in the scaled first tensor 418. A multiplication operator 420 can be used to perform an element-wise multiplication between the scaled first tensor 418 and the binary tensor mask 416 to generate the second tensor 410.

In a second embodiment, instead of scaling each element of the first tensor 402, the first tensor 402 can be directly multiplied with the binary tensor mask 416 using the multiplication operator 420, and each non-zero element in the multiplication output can be scaled by (1/(1-dropout rate)) as discussed with reference to FIG. 4B.

Figure 4B:
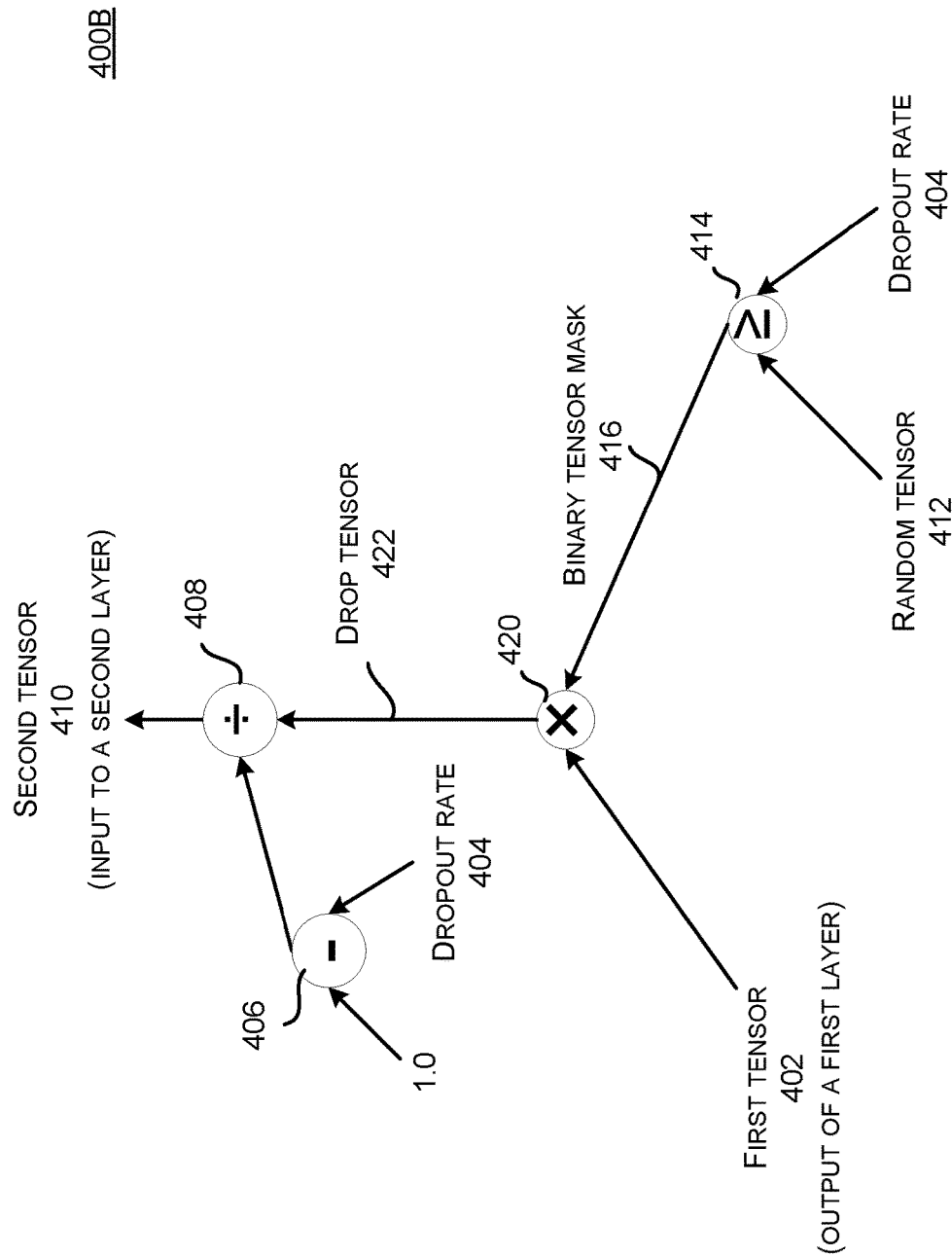
FIG. 4B illustrates a second data flow graph that includes operations to implement the dropout layer using scaled output tensor elements, in a second embodiment.

FIG. 4B illustrates a data flow graph 400B that includes operations to implement the dropout layer using scaled output tensor elements, in a second embodiment. The data flow graph 400B can be compiled by a compiler to generate instructions that can be executed by a neural network processor comprising an SIMD processor to implement a dropout layer between two layers of a neural network.

The binary tensor mask 416 can be generated as discussed with reference to FIG. 4A. The binary tensor mask 416 can be multiplied with the first tensor 402 using the multiplier 420 to produce a drop tensor 422 of shape N. The drop tensor 422 may include one or more elements that are 0 based on the drop rate 404 and the random tensor 412 as discussed with reference to FIG. 4A. To compensate for the dropped elements, non-zero elements of the drop tensor 422 can be scaled by (1/(1-drop rate)) to produce the second tensor 410. The scaling can be performed using the subtraction operator 406 and the division operator 408 as discussed with reference to FIG. 4A. The second tensor 410 may include scaled non-zero elements which may add up to an expected sum of the N elements in the first tensor 402. The second tensor 410 can be used as an input to the second layer. Generation of the second tensor 410 using the first tensor 410 is shown with example values in FIGS. 5A and 5B.

Figure 5A:
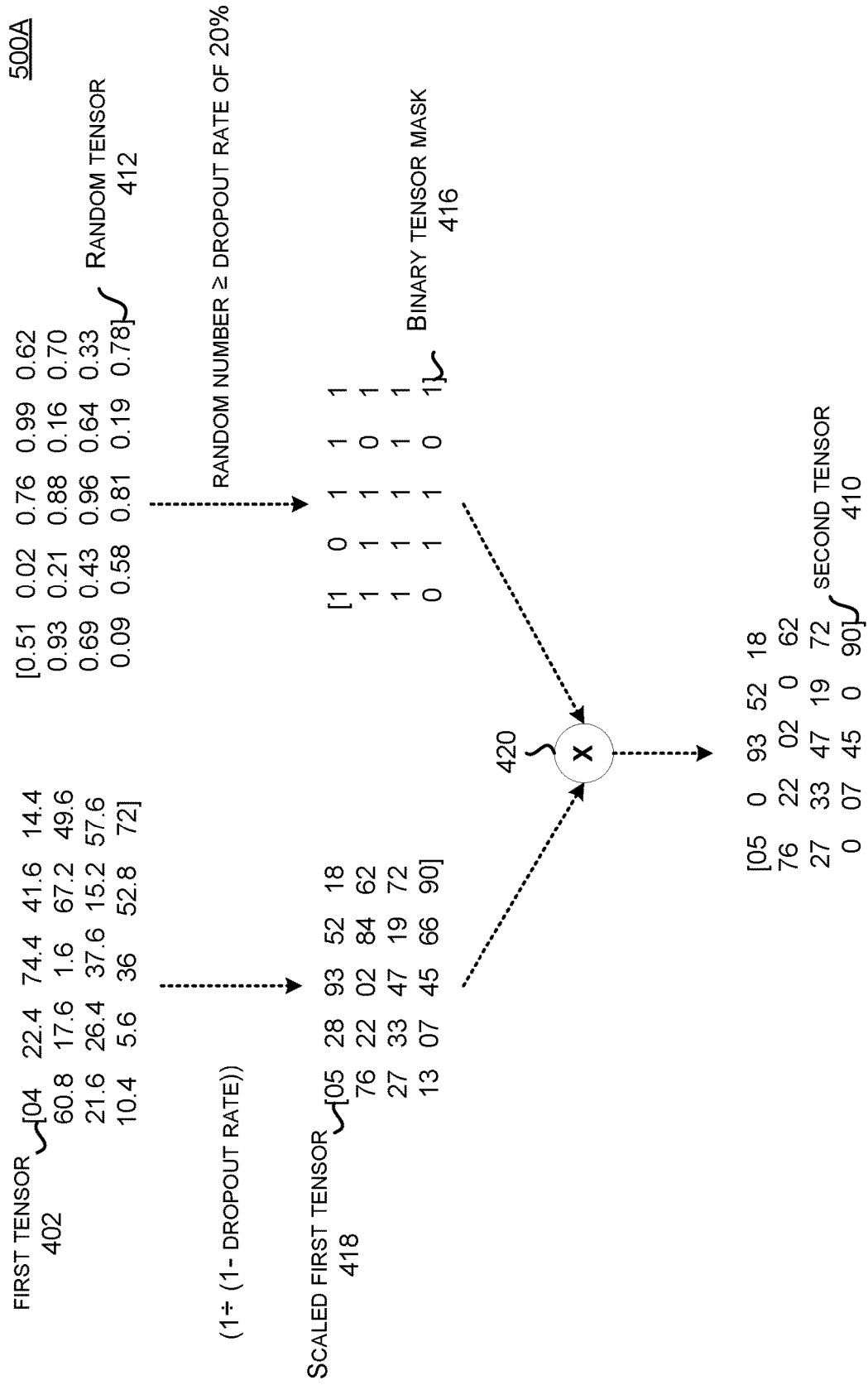
FIG. 5A shows generation of a second tensor from a first tensor to implement a dropout layer using example values, according to the first embodiment.

FIG. 5A shows a process flow 500A for generation of the second tensor 410 from the first tensor 402 using example values, according to the first embodiment.

As shown in FIG. 5A, the first tensor 402 can be a vector with 20 elements (e.g., Nis 20). The random tensor 412 can be a vector with 20 elements, with each element having a value between 0 and 1. For example, the N random numbers were generated using the random number generator in the SIMD processor. The scaled first tensor 418 can include 20 elements, where each of the 20 elements has been scaled from a respective element of the first tensor 402 by (1/(1−0.20)) using the subtraction operator 406 and the division operator 408. As an example, a first element in the first tensor 402 is 04. Given a dropout rate of 20, the subtraction operator 406 can subtract 0.20 from 1, and the subtraction result, having value 0.80, can be used by the division operator 408 to divide the first element having value 04 with the subtraction result of 0.80 to generate a first scaled element having value 05 in the scaled first tensor 418. Other elements in the first tensor 402 can be scaled similarly to generate respective elements in the scaled first tensor 418.

The binary tensor mask 416 can be a vector 416 with 20 elements which can be generated using the comparison operator 414 on the random tensor 412 and the dropout rate of 20. For example, a first element of the random tensor 412 having value 0.51 is greater than 0.20, and therefore a value of 1 is inserted for a first element of the binary tensor mask 416. Similarly, a second element of the random tensor 412 having value 0.02 is less than 0.20, and therefore a value of 0 is inserted for a second element of the binary tensor mask 416. Other elements of the binary tensor mask 416 can be generated similarly.

The second tensor 410 can be a vector with 20 elements and can be generated using the multiplication operator 420 by performing element-wise multiplication on the scaled first tensor 418 and the binary tensor mask 416. For example, the first element of the scaled first tensor 418, having a value 05, can be multiplied with the first element of the binary tensor mask 416, having a value 1, to generate a first element, having a value 05, in the second tensor 410. Similarly, a second element of the scaled first tensor 418, having a value 28, can be multiplied with the second element of the binary tensor mask 416, having a value 0, to generate a second element, having a value 0, in the second tensor 410. Other elements of the second tensor 410 can be generated similarly. Thus, an element in the first tensor 402 can be dropped out in the second tensor 410 based on the multiplication with a respective element of the binary tensor mask 416 having a 0 value. The number of elements set to 0 in the second tensor 410 can be equal to the dropout rate of the N elements in the first tensor 402. Scaling each element in the first tensor 402 can bring sum (e.g., 670) of the elements in the second tensor 410 closer to the sum (e.g., 688.8) of the N elements in the first tensor 402.

Figure 5B:
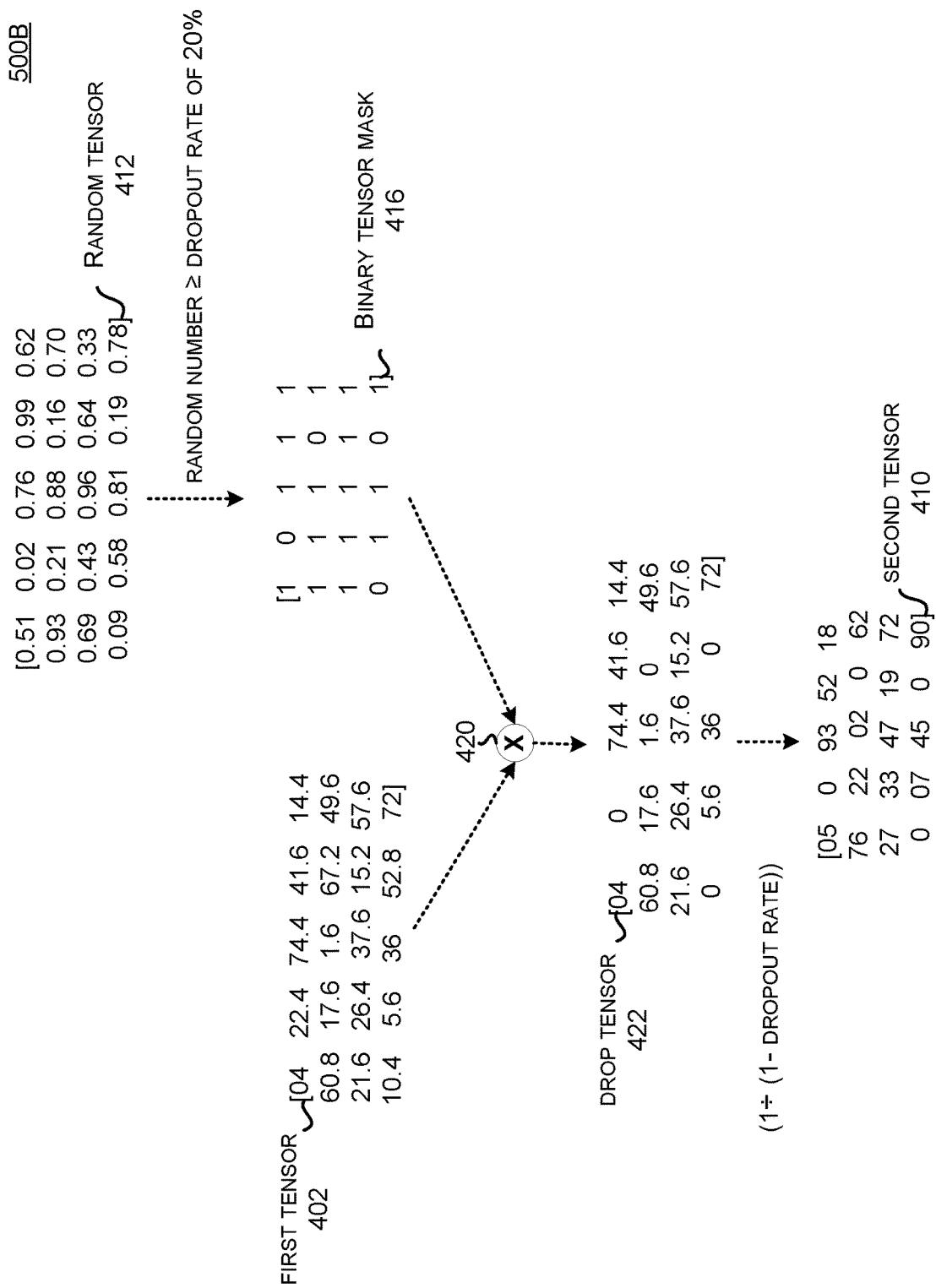
FIG. 5B shows generation of the second tensor from the first tensor to implement a dropout layer using example values, according to the second embodiment.

FIG. 5B shows a process flow 500B for generation of the second tensor 410 from the first tensor 402 using example values, according to the second embodiment.

As discussed with reference to FIG. 4B, instead of scaling each element of the first tensor 402, non-zero elements of the second tensor 410 can be scaled to compensate for the dropped elements. In the second embodiment, the multiplier 420 can be used to perform element-wise multiplication between the first tensor 402 and the binary tensor mask 416, which effectively sets four elements in the first tensor 402 to 0 to generate the drop tensor 422. Scaling each element of the drop tensor 422 by (1/(1−drop rate)) may provide the second tensor 410 with scaled elements. Thus, scaling each non-zero element in the drop tensor 422 can bring sum (e.g., 670) of the scaled elements in the second tensor 410 closer to the sum (e.g., 688.8) of the N elements in the first tensor 402.

The first tensor 402 can be an output of a first layer and the second tensor 402 can be an input to a second layer. Dropping out certain elements in the output of the first layer (e.g., the first tensor 402) before feeding it as an input to the second layer (e.g., the second tensor 410) can effectively implement a dropout layer between the first layer and the second layer. The first layer can be any layer in the CNN 200 of FIG. 2, for example, the convolution layer 215, pooling layer 225, convolution layer 235, pooling layer 245, or the fully connected layer 260. The second tensor 410 can be input to a subsequent layer of the first layer in FIG. 2. For example, output of the convolution layer 235 can be the first tensor 402, which can go through the operations described in the data flow graph 400 to dropout certain elements to generate the second tensor 410, which can be used as an input to the pooling layer 245.

Figure 6:
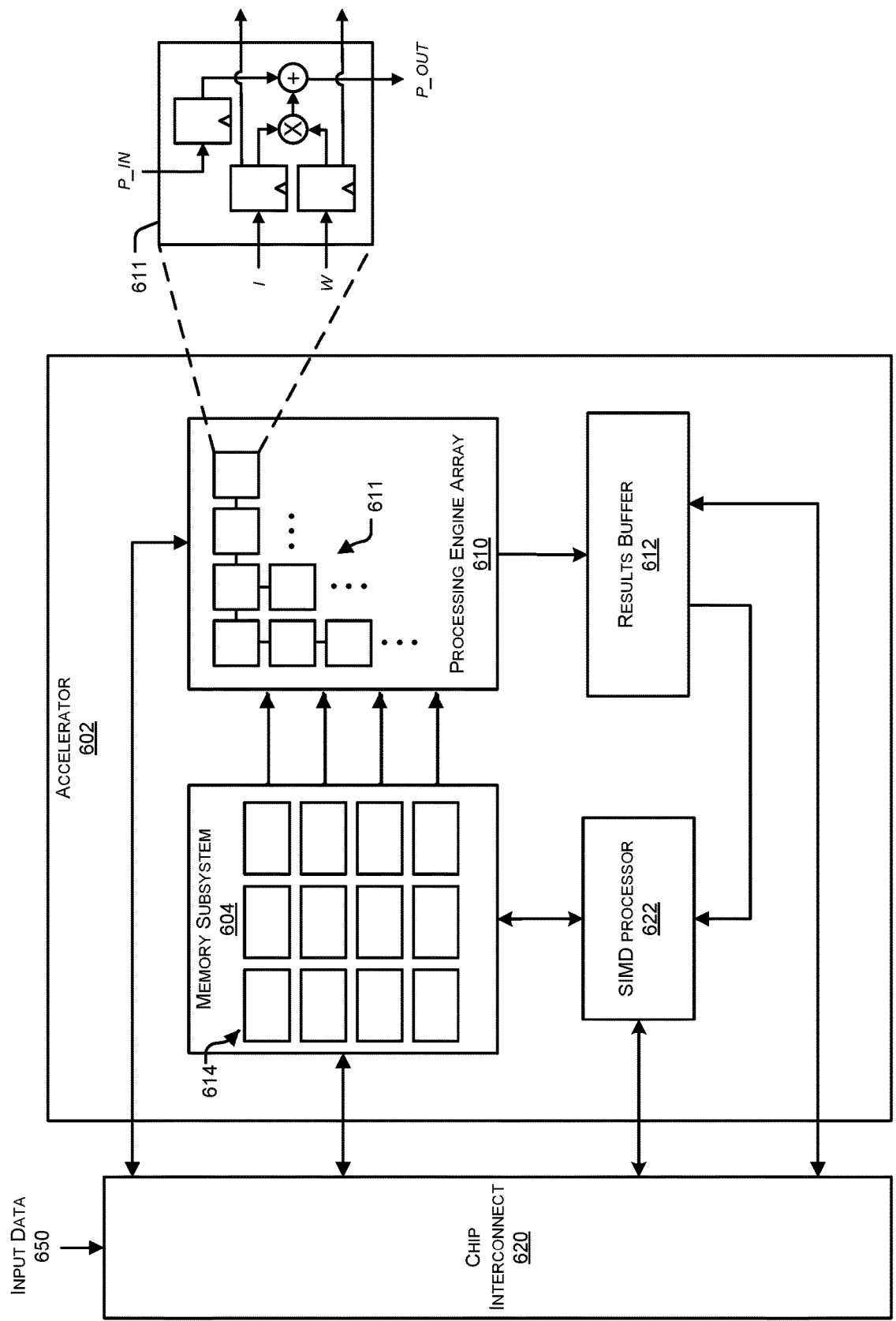
FIG. 6 is a block diagram illustrating an example of an integrated circuit device that can be configured to implement a dropout layer in a neural network using a single instruction multiple data (SIMD) processor, according to certain embodiments.

FIG. 6 is a block diagram illustrating an example of an integrated circuit device that may be configured to implement a dropout layer in a neural network using an SIMD processor, according to certain embodiments. The example of FIG. 6 illustrates an accelerator 602. In various examples, the accelerator 602, for a set of input data (e.g., input data 650), can execute computations using a processing engine array 610 and a SIMD processor 622. The accelerator 602 may also include a pooling engine or an activation engine based on the implementation. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604.

In contrast, a single memory may be able to service only one read or write at a time. With a single memory, multiple clock cycles can be required to, for example, read input data for each row of the processing engine array 610 before the processing engine array 610 can be started.

In various implementations, the memory subsystem 604 can be configured to simultaneously service multiple clients, including the processing engine array 610, the SIMD processor 622, and any external clients that access the memory subsystem 604 over a chip interconnect 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. In certain examples, any data associated with the implementation of the dropout layer can be stored in the memory banks 614. For example, the memory banks 614 can store the random tensor 412, binary tensor mask 416, scaled first tensor 418, second tensor 410, and any other data associated with the execution of the data flow graph 400. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication. The processing engine array 610 includes multiple processing engines 611, arranged in rows and columns, such that results output by one processing engine 611 can be input directly into another processing engine 611. Processing engines 611 that are not on the outside edges of the processing engine array 610 can thus receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w', where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move. In some examples, the input data and the weight value are output to the right, for input to the next processing engine 611.

In the illustrated example, an input from above can include a partial sum, p in, provided either from another processing engine 611 or from a previous round of computation by the processing engine array 610. When starting a computation for a new set of input data, the top row of the processing engine array 610 can receive a fixed value for p in, such as zero. As illustrated by this example, i and w are multiplied together and the result is summed with p in to produce a new partial sum, p out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614, can be read from the memory subsystem 604 over the chip interconnect 620, to be output by the system.

The SIMD processor 622 may be configured to execute a single instruction on N data elements simultaneously using N processor units. In certain embodiments, the SIMD processor 622 can provide multiple execution channels to perform parallel computations using an N-dimensional data path. For example, the SIMD processor 622 can comprise N scalar processors that can perform same operation on N data elements simultaneously. The SIMD processor 622 can be utilized to perform certain embodiments disclosed herein. Note that the functionality or components of the SIMD processor 622 can be implemented in other parts of the accelerator 602 without deviating from the scope of the disclosure.

In certain implementations, the SIMD processor data path can include up to N hardware random number generators to generate N random or pseudo-random numbers (e.g., int or unit) in parallel. N can be a positive integer (e.g., 32, 64, 128, 256). The random number generators can output with uniform distribution. As an example, based on a random generator operator, the compiler can generate an RNG instruction that can be executed by the SIMD processor 622 to generate the random tensor 410 of N elements, where each element has a value between 0 and 1. In certain implementations, the random number generators can be based on a linear-feedback shift register (LFSR), which can be seeded. However, other implementations of generating the random numbers are also possible.

In certain embodiments, the SIMD processor 622 may receive the first tensor 402 from the memory subsystem 604 or the results buffer 612. For example, the first tensor 402 may be output of a first layer computed by the processing engine array 610 by performing convolution operations on the first layer. The SIMD processor 622 may execute an instruction to generate N random numbers for the random tensor 412. The random tensor 412 can be stored in the memory subsystem 604. The SIMD processor 622 may also execute an instruction to scale the first tensor 402 to generate the scaled first tensor 418 as discussed with reference to FIG. 4A for the first embodiment. Next, the SIMD processor 622 may execute an instruction to populate the binary tensor mask 416 using the random tensor 412 and the dropout rate 404. The binary tensor mask 416 and the scaled first tensor 418 can be stored in the memory subsystem 604 and can be fetched by the SIMD processor 622 to perform the element-wise multiplication between the binary tensor mask 416 and the scaled first tensor 418 in parallel using the N scalar processors. The SIMD processor 622 may send the output of the multiplication (e.g., second tensor 410) to the memory subsystem 604, which can be used as an input to the processing engine array 610 for processing the next layer.

In the second embodiment, the SIMD processor 622 may execute an instruction to multiply the binary tensor mask 416 with the first tensor 402 to generate the drop tensor 422 as discussed with reference to FIG. 4B. The drop tensor 422 can be stored in the memory subsystem 604. Next, the SIMD processor 622 may execute an instruction to scale the drop tensor 422 by (1/(1−dropout rate)). The SIMD processor 622 may fetch the drop tensor 422 stored in the memory subsystem 604 and scale each element of the drop tensor 422 to generate the second tensor 410. The second tensor 410 can be sent to the memory subsystem 604, which can be used as an input to the processing engine array 610 for processing the next layer.

Input data 650 can arrive over the chip interconnect 620. The chip interconnect 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614, or in a separate instruction buffer. The processing engine array 610 can output intermediate results, which represent the outputs of individual layers of the neural network. In certain embodiments, the SIMD processor 622 may be enabled to implement a dropout layer based on the dropout operator. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
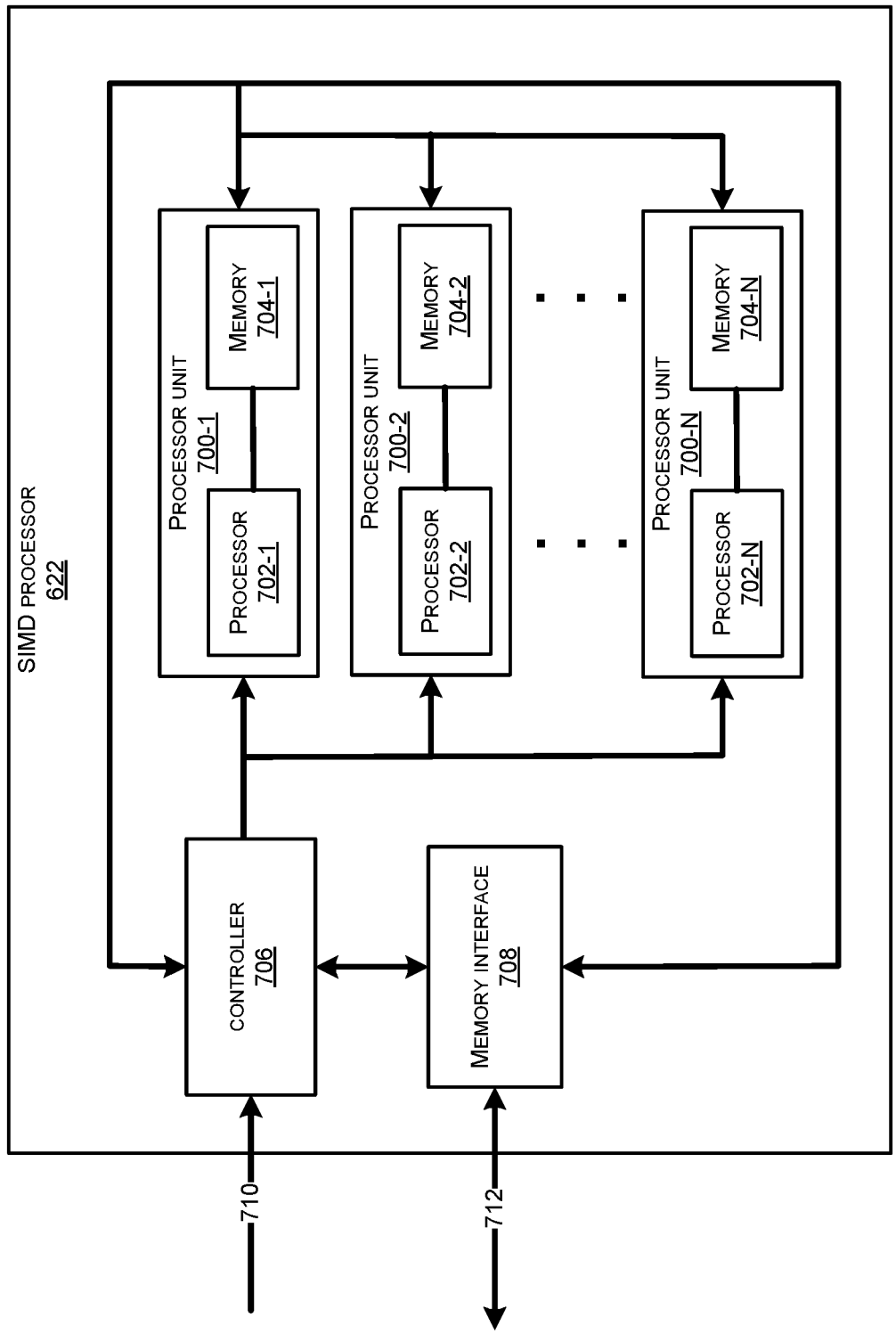
FIG. 7 illustrates an example block diagram for the SIMD processor that can be used to implement a dropout layer in a neural network.

FIG. 7 illustrates an example block diagram for the SIMD processor 622 that can be used to implement a dropout layer in a neural network, according to certain embodiments. The SIMD processor 622 can be part of a neural network processor, such as the accelerator 602. The SIMD processor 622 may be configured to execute a single instruction on N data elements simultaneously using N processor units (PUs) 700-1, 700-2, . . . , 700-N. Each PU may comprise N processors 702-1, 702-2, . . . , 702-N coupled to N memories 704-1, 704-2, . . . , 704-N, respectively. In certain implementations, each PU 700-1, 700-2, . . . , 700-N may be a scalar processor comprising an arithmetic logic unit (ALU), register files, and control unit, among others. The ALU may be used to perform arithmetic computations such as multiplication, division, subtraction, etc. The N memories 704-1, 704-2, . . . , 704-N can be implemented using any suitable memory including registers, or SRAM, among others. In certain embodiments, the PUs 700-1, 700-2, . . . , 700-N can include a random number generator based on an LFSR, which can be used to generated N random or pseudo-random numbers. The random number generator may be capable to generate up to N random numbers in parallel with uniform distribution.

The SIMD processor 622 may also include a controller 706, which can decode instructions and provide controls to various components of the SIMD processor 622 to perform different operations according to certain embodiments. The controller 706 may receive instructions from a host computer via an interface 710. Referring back to FIG. 6, the controller 706 may receive instructions that may be stored in the memory subsystem 604 or in an instruction buffer (not shown) in the accelerator 602. The controller 706 may include an instruction decoder to decode a given instruction and parse different parameters of the instruction (e.g., dropout operator, dropout rate, etc.). The controller 706 can provide controls to the PUs 700-1, 700-2, . . . , 700-N to perform the appropriate operation on N data elements in parallel based on the single instruction. For example, the instructions may include instructions to read data from the main memory, perform an arithmetic operation on the data, write data to the main memory, generate a random number, etc.

The SIMD processor 622 may also include a memory interface 708 which can be used to communicate with a main memory via an interface 712. Referring back to FIG. 6, the memory interface 708 can be used to read and write from the memory subsystem 604 or the results buffer 612. The interface 712 can include any suitable interface based on the implementation, for example, memory bus, serial bus. The memory interface 708 may include buffers, memory controllers, or other suitable components to enable the communication with the main memory.

The PUs 700-1, 700-2, . . . , 700-N may provide a parallel data path to perform certain operations based on the instructions. In certain embodiments, some of the instructions may include reading tensors from or writing tensors to the memory subsystem 604 and performing an operation on the tensors. For example, the controller 706 may decode an instruction to generate N random numbers and enable the PUs 700-1, 700-2, . . . , 700-N to generate the random tensor 412 of shape N using a random number generator. In certain embodiments, each random number in the random tensor 412 may have a value between 0 and 1. The random tensor 412 can be stored in the memory subsystem 604 via the memory interface 708.

In another example, the controller 706 may decode an instruction to generate the binary tensor mask 416 of shape N using the random tensor 412 and the dropout rate 404. The controller 706 may enable the PUs 700-1, 700-2, . . . , 700-N to perform the comparison operation 414 in parallel on N elements of the random tensor 412 and the dropout rate 404 using the processors 702-1, 702-2, . . . 702-N. For example, the binary tensor mask 416 may include a 1 for each element in the random tensor 412 that is greater than or equal to the dropout rate 404, and a 0 for each element in the random tensor 412 that is smaller than the dropout rate 404. The random tensor 412 can be read from the memory subsystem 604 via the memory interface 708 for processing by the PUs. The dropout rate 404 can be provided with the instruction and can be parsed by the controller 706 when decoding the instruction. The binary tensor mask 416 can be stored in the memory subsystem 604 via the memory interface 708.

In certain examples, the controller 706 may decode an instruction to scale the first tensor 402 according to the first embodiment discussed in FIG. 4A. The first tensor 402 can be read from the memory subsystem 604 via the memory interface 708 to be processed by the PUs. The PUs can perform the subtraction operation 406 and the division operation 408 on the first tensor 402 and the dropout rate to scale each element of the first tensor 402 to generate the scaled first tensor 418. The scaled first tensor 418 can be stored in the memory subsystem 604 via the memory interface 708.

In certain examples, the controller 706 may decode an instruction to perform an element-wise multiplication on the first tensor 402 (or the scaled first tensor 418) and the binary tensor mask 416. The first tensor 402 (or the scaled first tensor 418) and the binary tensor mask 416 can be read from the memory subsystem 604 via the memory interface 708 to be processed by the PUs. The PUs can perform the multiplication operation 420 on the scaled first tensor 418 and the binary tensor mask 416 to generate the second tensor 410 in the first embodiment. The PUs can perform the multiplication operation 420 on the first tensor 402 and the binary tensor mask 416 to generate the drop tensor 422 in the second embodiment. The second tensor 410 or the drop tensor 422 can be stored in the memory subsystem 604 via the memory interface 708. The second tensor 410 can be fed to the processing engine array 610 as an input to the second layer.

In certain examples, the controller 706 may decode an instruction to scale the drop tensor 422 according to the second embodiment discussed in FIG. 4B. The drop tensor 422 can be read from the memory subsystem 604 via the memory interface 708 to be processed by the PUs. The PUs can perform the subtraction operation 406 and the division operation 408 on the drop tensor 422 and the dropout rate to scale each element of the drop tensor 422 to generate the second tensor 410. The second tensor 410 can be stored in the memory subsystem 604 via the memory interface 708 to be fed to the processing engine array 610 as an input to the second layer.

Figure 8:
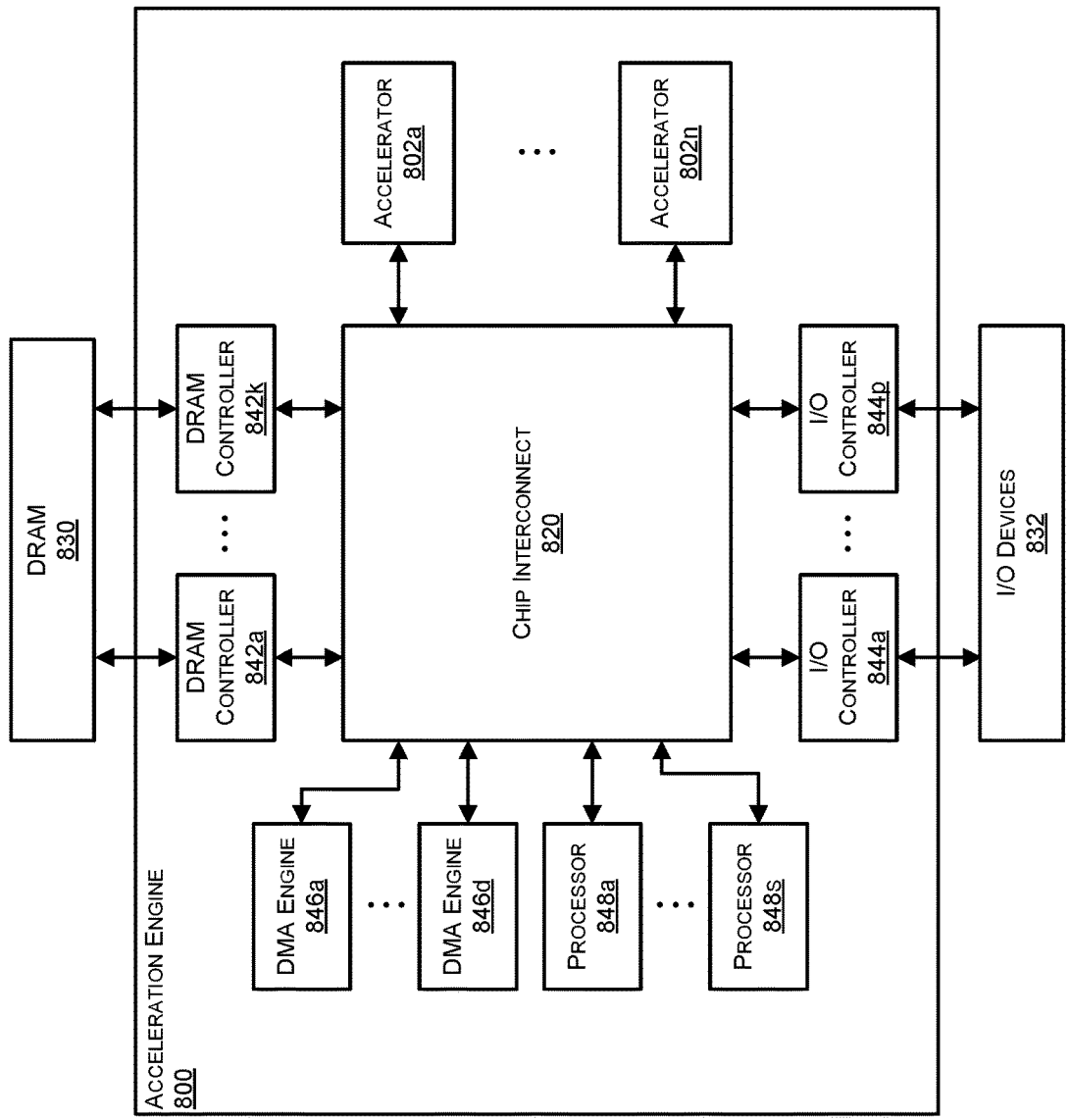
FIG. 8 includes a block diagram that illustrates an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator 602 described with reference to FIG. 6.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, and neural network accelerators. In various examples, the accelerators 802a-802n can each be the same (e.g., each of the accelerators 802a-802n is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of Random Access Memory (RAM) technology can be used for the external memory. The DRAM controllers 842a-842k can also be referred to as memory controllers.

In various examples, input data and/or program code for the accelerators 802a-802n can be stored in the DRAM 830.

Different programs can cause the accelerators 802*a*-802*n* to perform different operations. For example, when one of the accelerators is a neural network accelerator, one program can configure the neural network accelerator to perform speech recognition while another program can configure the neural network accelerator to perform image recognition. In various examples, different accelerators 802*a*-802*n* can be programmed with different programs, so that each performs a different set of operations. In various examples, the processors 848*a*-848*s* can manage moving program code from the DRAM 830 to the accelerators 802*a*-802*n*.

The example acceleration engine 800 further includes I/O controllers 844*a*-844*p* for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards. In some examples, the I/O controllers 844-844*p* can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844*a*-844*p*, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848*a*-848*s*, which can also be referred to as data management processors. In the example of FIG. 8, the acceleration engine 800 includes s processors 848*a*-848*s* incorporated into the device (e.g., on the same silicon die). In other examples, the processors 848*a*-848*s* can be external to the acceleration engine 800 (e.g., on a different die and/or in a different package). In some examples, the processors 848*a*-848*s* can manage the movement of data from I/O devices 832 to the accelerators 802*a*-802*n* or the DRAM 830. For example, input data may be located at an I/O device 832 or in processor memory, and the processors 848*a*-848*s* can move the input from the I/O device 832 or processor memory into an accelerator 802*a*-802*n* or into DRAM 830. As another example, program code for the accelerators 802*a*-802*n* may be located on an I/O device 832 or in processor memory.

The example acceleration engine 800 further includes DMA engines 846*a*-846*d* that can move data between the accelerators 802*a*-802*n*, DRAM controllers 842*a*-842*k*, and I/O controllers 844*a*-844*p*. In the illustrated example, the acceleration engine 800 includes d DMA engines 846*a*-846*d*. In some implementations, the DMA engines 846*a*-846*d* can be assigned to specific tasks, such as moving data from the DRAM controllers 842*a*-842*d* to the accelerators 802*a*-802*n*, or moving data between the I/O controllers 844*a*-844*p* and the accelerators 802*a*-802*n*. These tasks can be assigned, for example, by enqueueing descriptors with the DMA engines 846*a*-846*d*, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848*a*-848*s* can be responsible for managing the data movement for a different accelerator. In some examples, a processor may manage the data movement for more than one accelerator. Similarly, in various examples, each of the processors 848*a*-848*s* can be assigned to one or more DMA engines 846*a*-846*d*. In these and other examples, associations between processors 848*a*-848*s*, accelerators 802*a*-802*n*, and DMA engines 846*a*-846*d* are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexors to control the direction of data, flip-flops for handling clock domain crossings, and timing logic.

Figure 9:
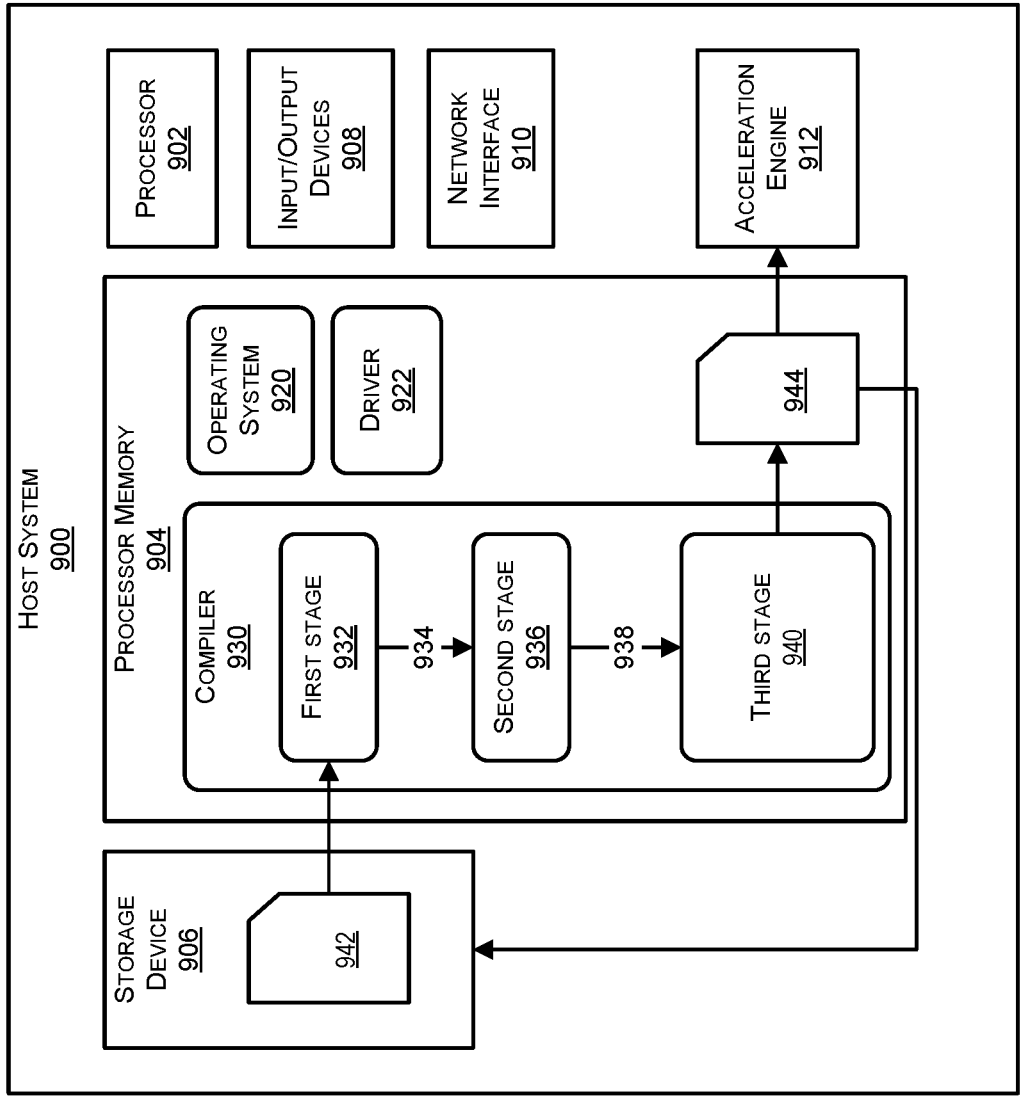
FIG. 9 includes a block diagram that illustrates an example of a host system.

FIG. 9 includes a block diagram illustrating an example of a host system 900 on which a compiler 930, such as is described herein, can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. The acceleration engine 912 can be similar to the acceleration engine 800 described with reference to FIG. 8. In various examples, the host system 900 can be implemented as a server in a data center, a desktop computer, a laptop computer, a tablet computer, or a smartphone. In some examples, operations or components discussed below as performed or included in the host system 900 can be performed or included in other computer devices. For example, the compiler 930 can execute on the host system 900 while the acceleration engine 912 is located at a different host system.

The processor 902 is an integrated circuit device that can execute program code, in the form of instructions. The program code can be for various software applications or tools, such as an operating system 920 or the illustrated compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of RAM, though non-volatile memory types can, alternatively or additionally, be used for the processor memory 904.

The storage device 906 is an example of a device that can include non-volatile memory. For example, the storage device 906 can be a magnetic disk drive, a solid state drive, or an optical drive. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 108 and the network interface 912. The Input/Output devices 908 can include user input and output devices, such as keyboards, mice, touch screens, microphones, display screens, speakers, printers, and scanners. The network interface 912, which can be implemented using a network interface card, can provide access to one or more networks. The network interface 912 can include, for example, a physical port for connecting a network cable and/or wireless antennas for communicating with Wi-Fi and/or cellular networks. The network interface 912 can also be described as an I/O device.

The acceleration engine 912 is also another type of peripheral device or I/O device. The acceleration engine 912 is a device that is purpose built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a graphics processing unit (GPU), and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs speech synthesis or one that performs machine translation. As a further example, to support the execution of a neural network, the acceleration engine 912 can be programed to perform operations such as copying data for the neural network from processor memory 904 (for example) into the acceleration engine 912, copying input data for the neural network from processor memory 904 into the acceleration engine 912, and/or copying results from the acceleration engine 912 into the processor memory 904.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network description into instructions to be executed by the accelerators 802a-802n in the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configuration options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942. The input code 942 can describe a program in a high-level programming language, such as Java, C++, or TensorFlow. The input code 942 can describe, for example, steps to perform image recognition, speech synthesis, speech recognition, machine translation, or other operations. The input code 942 can be obtained, for example, from the storage device 906. Alternatively, though not illustrated here, the input code 942 may be located in the processor memory 904 or can be obtained from a network location, using the network interface 912. Processing of the input code 942 can include sorting the operations described in the input code 942 into layers, where the outputs of one layer provide the inputs to a next layer. For example, processing of the input code 942 can result in a data flow graph similar to the data flow graph 300. In certain embodiments, the input code 942 may also include dropout operators to enable the implementation of a respective dropout layer between any two layers to reduce overfitting in inference mode, as discussed with reference to the dropout operators 306 and 314 in FIG. 3. Processing can also include identifying steps to be performed by the processor 902, rather than by the acceleration engine 912. For example, the processor 902, through the execution of a driver 922, may need to perform steps such as configuring DMA descriptors for moving data into or out of the acceleration engine 912.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of locale storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples. For example, the output 938 may include the data flow graph 400A or 400B as discussed with reference to FIG. 4A or 4B.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possibly optimizations in memory usage or memory bandwidth usage, and other operations.

The output of the third stage 940 is compiled code 944, which may include machine instructions in binary format. The compiled code 944 may include instructions that can be executed by the SIMD processor 622 in the acceleration engine 912 to implement a dropout layer between two layers of a neural network. For example, the instructions can be decoded by the controller 706 to enable the PUs 700-1, 700-2, . . . , 700-N to perform certain operations to implement the dropout layer in inference mode. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 912 to the other host system.

In the example of FIG. 9, the host system 900 can be executing a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 906 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to being executing on the input data. Once the acceleration engine 912 has finished, the acceleration engine 912 can notify the driver 922, and the driver 922 can deliver a result back to the application that requested the result.

In certain examples, the host system 900 can be one of the nodes on a network that includes multiple nodes. The multiple nodes in the network may include other host systems or computing devices. One or more computing devices may include a memory for storing program instructions, a processor for executing the instructions, and a network interface for connecting to the network. For example, the network can be used to process data. The input data can be received at one of the nodes or from other networks with which the network can communicate. In this example, the input data can be directed to a node in the network that includes an acceleration engine (e.g., similar to the acceleration engine 912), for the acceleration engine to operate on and produce a result. The result can then be transferred to the node or other network from which the input data was received. In various examples, the input data can be accumulated from various sources, including one or more of the nodes and/or computing devices located in the other networks, and the accumulated input data can be directed to one or more host systems in the network. Results from the host systems can then be distributed back to the sources from which the input data was gathered.

Figure 10:
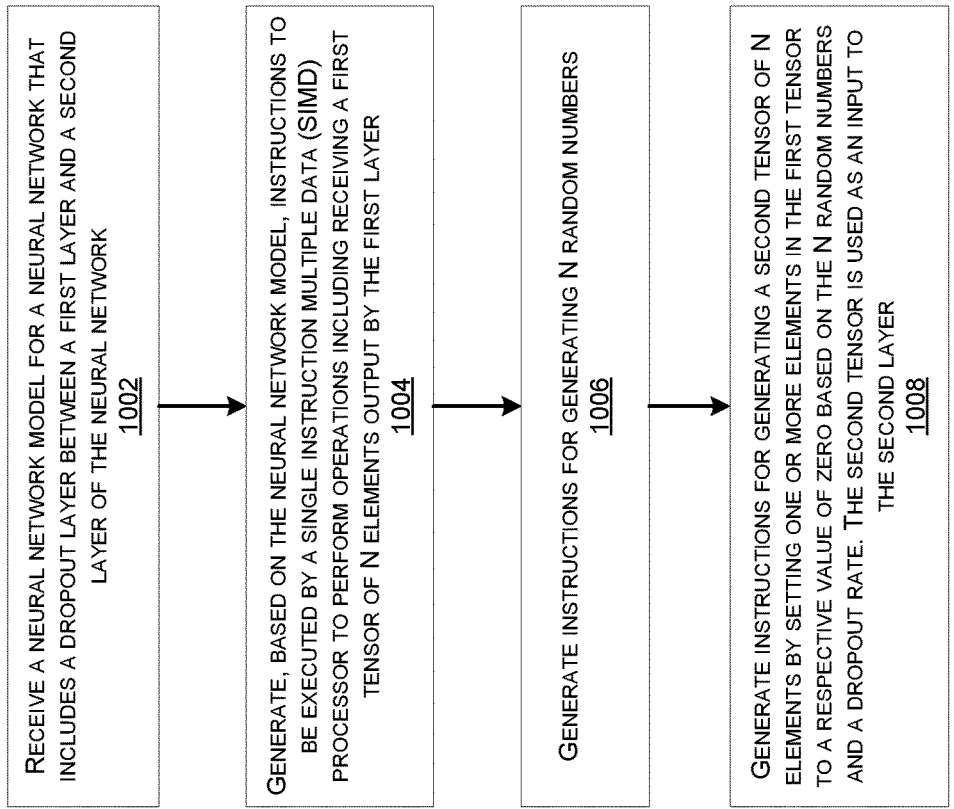
FIG. 10 illustrates a computer implemented method to implement a dropout layer between a first layer and a second layer of a neural network according to certain embodiments.

FIG. 10 illustrates a computed implemented method 1000 to implement a dropout layer between a first layer and a second layer of a neural network according to certain embodiments. The method 1000 can be performed by a compiler, such as the compiler 930 of FIG. 9.

At step 1002, the compiler may receive a neural network model for a neural network that includes a dropout layer between a first layer and a second layer of the neural network. The neural network may include nodes as described with reference to the neural network 100 of FIG. 1. The neural network may include multiple layers, for example, convolution layers, pooling layers, activation layers, fully connected layers, as discussed with reference to FIG. 2. According to certain embodiments, a dropout layer can be implemented between any two layers of the neural network. For example, as shown in FIG. 3, a dropout layer can be implemented between a fully connected layer and a convolution layer based on the dropout operator 306, or another dropout layer can be implemented between a pooling layer and a fully connected layer based on the dropout operator 314. As discussed with reference to FIG. 9, the dropout operator can be set in the input code 942 to be compiled by the compiler 930.

At step 1004, the compiler may generate, based on the neural network model, instructions to be executed by an SIMD processor to perform certain operations. In certain examples, the compiler 930 may generate compiled code 944 including machine instructions that can be executed by the accelerator 602. For example, the accelerator 602 can be the accelerator 802*a* in the acceleration engine 912. The instructions may be generated based on a data flow graph which may include the data flow graph 400 of FIG. 4. The instructions may be received by the accelerator 602 and stored in an instruction buffer or in the memory subsystem 604 as discussed with reference to FIG. 6. Various portions of the instructions may be executed by different execution engines in the accelerator 602 (e.g., the processing engine array 610, or the SIMD processor 622). The SIMD processor 622 may receive the instructions to be executed for implementing a dropout layer via the interface 710. The instructions may be decoded by the controller 706 in the SIMD processor 622 to perform certain operations using the PUs 700-1, 700-2, . . . , 700-N. The PUs 700-1, 700-2, . . . , 700-N may execute the same instruction in parallel on the N elements of the tensor. In certain examples, the instructions to perform the operations for implementing a dropout layer by the SIMD processor 622 may be based on the dropout operator being set or asserted. The dropout operator may be part of an instruction that can be parsed by the controller 706.

The instructions may include receiving a first tensor of N elements output by the first layer. For example, the first tensor of N elements can be the first tensor 402 output by the first layer and stored in the memory subsystem 604 to be fed to the processing engine array 610 as an input to the second layer. The SIMD processor 622 may execute an instruction to read the first tensor 402 from the memory subsystem 604. The first tensor 402 can be received by the SIMD processor 622 using the memory interface 708 to be operated on by the PUs 700-1, 700-2, . . . , 700-N.

At step 1006, generate instructions for generating N random numbers. The SIMD processor 622 may execute an instruction that includes generating N random numbers within a given range. The PUs 700-1, 700-2, . . . , 700-N may use a random or pseudo-random number generator to generate the random tensor 412 of N elements in parallel. In certain implementations, the random numbers may be generated based on an LFSR for a given seed. In certain examples, each random number in the random tensor 412 may have a value between 0 and 1. The generated random tensor 412 may be stored in the memory subsystem 604 using the memory interface 708.

At step 1008, generate instructions for generating a second tensor of N elements by setting one or more elements in the first tensor to a respective value of zero using the N random numbers and a dropout rate. The second tensor can be used an input to the second layer. In certain embodiments, setting each of the one or more elements in the first tensor may be based on a respective random number in the N random numbers being less than the dropout rate. For example, the SIMD processor 622 may execute an instruction to generate the binary tensor mask 416 of N binary elements having values 1 or 0. Each binary element of value 1 in the binary tensor mask 416 may correspond to a respective random number that is greater than or equal to the dropout rate, and each binary element of value 0 may correspond to the respective random number that is smaller than the dropout rate.

Referring back to FIG. 7, the controller 706 may enable the PUs 700-1, 700-2, . . . , 700-N to perform the comparison operation 414 in parallel on N elements of the random tensor 412 and the dropout rate 404 using the processors 702-1, 702-2, . . . 702-N to generate the binary tensor mask 416. The dropout rate 404 may be part of an instruction and can be parsed by the controller 706. In certain examples, the random tensor 412 may be read from the memory subsystem 604 using the memory interface 708 and operated on by the PUs 700-1, 700-2, . . . , 700-N along with the dropout rate 404 to generate the binary tensor mask 416. The generated binary tensor mask 416 may be stored in the memory subsystem 604 using the memory interface 708. Each binary element having a value 0 in the binary tensor mask 416 can be used to set a respective element in the first tensor 402 to zero by executing a multiplication instruction.

The SIMD processor 622 may execute the multiplication instruction to perform an element-wise multiplication between the binary tensor mask 416 and the first tensor 402 to produce the second tensor 410 of N elements. In certain examples, the binary tensor mask 416 and the first tensor 402 may be read from the memory subsystem 604 using the memory interface 708 and operated on by the PUs 700-1, 700-2, . . . , 700-N to perform the multiplication operation to generate the second tensor 410. The second tensor 410 may be stored in the memory subsystem 604 using the memory interface 708. The second tensor 410 can be read from the memory subsystem 604 into the processing engine array 610 as an input to the second layer.

In certain examples, the SIMD processor 622 may generate another instruction to scale the first tensor 402 by (1/(1−dropout rate)) to generate the scaled first tensor 418 before executing the multiplication instruction, according to the first embodiment discussed in FIG. 4A. For example, the first tensor 402 may be read from the memory subsystem 604 and operated on by the PUs 700-1, 700-2, . . . , 700-N along with the dropout rate 404 to scale each of the N elements in the first tensor 402. The scaled first tensor 418 can be stored in the memory subsystem 604 using the memory interface 708. In this case, the PUs 700-1, 700-2, . . . , 700-N may perform the multiplication on the scaled first tensor 418 and the binary tensor mask 416 to keep a first sum of the N elements in the first tensor 402 close to a second sum of the N elements in the second tensor 410.

In the second embodiment, the SIMD processor 622 may generate an instruction to scale each non-zero element in the second tensor 410 by (1/(1−dropout rate)) to keep a first sum of the N elements in the first tensor 402 close to a second sum of the scaled elements in the second tensor 410. As discussed with reference to FIG. 4B, the drop tensor 422 may be read from the memory subsystem 604 and operated on by the PUs 700-1, 700-2, . . . , 700-N along with the dropout rate 404 to scale each of the non-zero elements in the drop tensor 422 to generate the second tensor 410. The second tensor 410 with the scaled elements may be stored in the memory subsystem 604 using the memory interface 708. The second tensor 410 with the scaled elements can be read from the memory subsystem 604 into the processing engine array 610 as an input to the second layer.

Thus, as discussed with reference to FIGS. 1-10, certain embodiments can be used to implement a dropout layer between two layers of a neural network in inference mode. The dropout layer can be implemented using the SIMD processor by randomly setting certain elements in the output of the first layer to zero before feeding it as an input to the second layer. Utilizing the SIMD processor to perform parallel computations on tensor elements can enable acceleration of certain neural networks for applications like natural language processing, text-to-speech synthesis, among others. Furthermore, implementation of the dropout layer using the neural network processor can eliminate involvement of the host CPU for the dropout layer implementation so that the host CPU can focus on other important tasks.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, functions described herein can be provided by one or more modules that exist as separate modules, and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device configured to implement a dropout layer in a neural network, the integrated circuit device comprising:
   a memory subsystem;
   a processing engine array configured to perform convolution operations on multiple layers of the neural network, the multiple layers comprising a first layer and a second layer, wherein:
      the processing engine array comprises a two-dimensional array of computation circuits,
      output of the first layer comprises intermediate results that form input of the second layer, and
      the processing engine array is configured to store the intermediate results as a first tensor of N elements in the memory subsystem or a separate results buffer; and
   a single instruction multiple data (SIMD) processor communicatively coupled to the processing engine array through the memory subsystem, the SIMD processor being configured to implement the dropout layer between the first layer and the second layer based on a dropout rate by executing a first set of instructions concurrently with execution, by the processing engine array, of a second set of instructions that implement the convolution operations using pretrained parameters, wherein:
      the first set of instructions and the second set of instructions are generated by a compiler of a host system external to the integrated circuit device,
      the first set of instructions is generated based on a dropout operator being set when the compiler received a model of the neural network,
      the dropout layer is configured to operate as a pass through layer whenever the dropout operator is not set, and
      the first set of instructions configures the SIMD processor to perform operations including:
         obtaining the first tensor from the memory subsystem or the results buffer, wherein the processing engine array is configured to store the first tensor in the memory subsystem or the results buffer after executing a portion of the second set of instructions that configures the processing engine array to perform convolution operations of the first layer;
         generating N pseudo-random numbers in parallel through executing a same instruction on different random number generator circuits of the SIMD processor, each pseudo-random number being generated by a respective random number generator circuit executing the same instruction, wherein the N pseudo-random numbers are arranged into a random tensor that is stored in the memory subsystem and has a same shape as the first tensor;
         transforming the random tensor in the memory subsystem into a binary tensor mask of N binary elements through setting each of the N pseudo-random numbers to 1 or 0 depending on the value of the pseudo-random number relative to the dropout rate, wherein each binary element of value 1 corresponds to a respective pseudo-random number that is greater than or equal to the dropout rate, and each binary element of value 0 corresponds to a respective pseudo-random number that is smaller than the dropout rate;
         performing an element-wise multiplication between the binary tensor mask and the first tensor to produce a second tensor of N elements, wherein the element-wise multiplication sets elements in the second tensor which correspond in position to binary elements of value 0 to also be 0; and
         storing the second tensor in the memory subsystem, wherein the processing engine array is further configured to obtain the second tensor from the memory subsystem as the input of the second layer in connection with executing a portion of the second set of instructions that configures the processing engine array to perform convolution operations of the second layer.

2. The integrated circuit device of claim 1, the instructions further including:
   prior to performing the element-wise multiplication, scaling each of the N elements in the first tensor by (1/(1−dropout rate)) to keep a first sum of the N elements in the second tensor closer to a second sum of the N elements in the first tensor.

3. The integrated circuit device of claim 1, the instructions further including:
   scaling each non-zero element in the second tensor by (1/(1−dropout rate)) to keep a first sum of scaled elements in the second tensor closer to a second sum of the N elements in the first tensor.

4. A computer implemented method comprising:
receiving, by a compiler executed using one or more processors, a neural network model for a neural network that includes a dropout layer between a first layer and a second layer of the neural network, wherein the neural network model includes a dropout operator that is settable to configure the dropout layer of the neural network, the dropout layer operating as a pass through layer whenever the dropout operator is not set; and
generating, by the compiler and based on the neural network model, a first set of instructions to be executed by a single instruction multiple data (SIMD) processor and a second set of instructions to be executed by a processing engine array, wherein:
the processing engine array comprises a two-dimensional array of computation circuits,
the SIMD processor is communicatively coupled to the processing engine array through a memory subsystem,
the second set of instructions configures the processing engine array to perform operations of the first layer and the second layer using pretrained parameters,
the compiler generates the first set of instructions based on the dropout operator being set when the compiler received the neural network model, and
the first set of instructions configures the SIMD processor to perform operations of the dropout layer, the operations of the dropout layer including:
obtaining, from the memory subsystem or a results buffer, a first tensor of N elements output by the first layer, wherein the processing engine array stores the first tensor in the memory subsystem or the results buffer after executing a portion of the second set of instructions that configures the processing engine array to perform operations of the first layer;
generating, through parallel processing on different random number generator circuits within the SIMD processor, N random numbers in parallel to form a random tensor in the memory subsystem, the random tensor comprising the N random numbers arranged in a same shape as the first tensor;
transforming the random tensor into a tensor mask through setting a subset of the N random numbers to zero based on a dropout rate;
generating a second tensor of N elements through applying the tensor mask to the first tensor after fetching the tensor mask from the memory subsystem, wherein the tensor mask causes elements in the second tensor which correspond in position to the subset of the N random numbers to also be set to zero; and
storing the second tensor in the memory subsystem for use by the processing engine array as an input of the second layer, wherein the processing engine array obtains the second tensor from the memory subsystem in connection with executing a portion of the second set of instructions that configures the processing engine array to perform operations of the second layer.

5. The computer implemented method of claim 4, wherein transforming the random tensor into the tensor mask comprises setting any random number having a value less than the dropout rate to zero.

6. The computer implemented method of claim 4, wherein the operations of the dropout layer further include, prior to generating the second tensor, scaling each of the N elements in the first tensor by (1/(1−dropout rate)) to keep a first sum of the N elements in the first tensor close to a second sum of the N elements in the second tensor.

7. The computer implemented method of claim 4, wherein the operations of the dropout layer further include scaling each non-zero element in the second tensor by (1/(1−dropout rate)) to keep a first sum of the N elements in the first tensor close to a second sum of the scaled elements in the second tensor.

8. The computer implemented method of claim 4, wherein the neural network model further includes convolution operations in the first layer and the second layer, the method further comprising generating, by the compiler, the second set of instructions to include instructions that configure the processing engine array to perform the convolution operations.

9. The computer implemented method of claim 8, wherein the SIMD processor and the processing engine array are part of a neural network processor.

10. The computer implemented method of claim 8, wherein the two-dimensional array is a systolic array of computation circuits arranged in rows and columns to perform the convolution operations.

11. The computer implemented method of claim 8, wherein the processing engine array performs the convolution operations using the pretrained parameters and as part of making an inference on an input dataset, and wherein the pretrained parameters were obtained through training the neural network model with the dropout operator set to provide the dropout layer during the training.

12. The computer implemented method of claim 4, wherein the first layer and the second layer are fully connected layers followed by activation.

13. A non-transitory computer-readable medium having stored therein instructions that, when executed by one or more processors cause the one or more processors to execute a compiler, the compiler performing operations including:
receiving a neural network model for a neural network that includes a dropout layer between a first layer and a second layer of the neural network, wherein the neural network model includes a dropout operator that is settable to configure the dropout layer of the neural network, the dropout layer operating as a pass through layer whenever the dropout operator is not set; and
generating, by the compiler and based on the neural network model, a first set of instructions to be executed by a single instruction multiple data (SIMD) processor and a second set of instructions to be executed by a processing engine array, wherein:
the processing engine array comprises a two-dimensional array of computation circuits,
the SIMD processor is communicatively coupled to the processing engine array through a memory subsystem,
the second set of instructions configures the processing engine array to perform operations of the first layer and the second layer using pretrained parameters,
the compiler generates the first set of instructions based on the dropout operator being set when the compiler received the neural network model, and
the first set of instructions configures the SIMD processor to perform operations of the dropout layer, the operations of the dropout layer including:
obtaining, from the memory subsystem or a results buffer, a first tensor of N elements output by the first layer, wherein the processing engine array stores the first tensor in the memory subsystem or the results buffer after executing a portion of the second set of instructions that configures the processing engine array to perform operations of the first layer;

generating, through parallel processing on different random number generator circuits within the SIMD processor, N random numbers in parallel to form a random tensor in the memory subsystem, the random tensor comprising the N random numbers arranged in a same shape as the first tensor;

transforming the random tensor into a tensor mask through setting a subset of the N random numbers to zero based on a dropout rate;

generating a second tensor of N elements through applying the tensor mask to the first tensor after fetching the tensor mask from the memory subsystem, wherein the tensor mask causes elements in the second tensor which correspond in position to the subset of the N random numbers to also be set to zero; and storing the second tensor in the memory subsystem for use by the processing engine array as an input of the second layer, wherein the processing engine array obtains the second tensor from the memory subsystem in connection with executing a portion of the second set of instructions that configures the processing engine array to perform operations of the second layer.

14. The non-transitory computer-readable medium of claim 13, wherein transforming the random tensor into the tensor mask comprises setting any random number having a value less than the dropout rate to zero.

15. The non-transitory computer-readable medium of claim 13, wherein the operations performed by the compiler further include generating the second set of instructions to include instructions that configure the processing engine array to perform convolution operations on the first layer and the second layer.

16. The non-transitory computer-readable medium of claim 15, wherein the processing engine array and the SIMD processor are part of a neural network processor.

17. The non-transitory computer-readable medium of claim 16, wherein the compiler is executed on a first host system, and wherein the neural network processor is part of an acceleration engine in a second host system.

* * * * *